US010026235B2

(12) United States Patent
Van Rens

(10) Patent No.: US 10,026,235 B2
(45) Date of Patent: Jul. 17, 2018

(54) METHOD AND SYSTEM FOR DETECTING AN EVENT ON A SPORTS TRACK

(75) Inventor: Bas Jan Emile Van Rens, Haarlem (NL)

(73) Assignee: AMB I.T. HOLDING B.V., Haarlem (NL)

( * ) Notice: Subject to any disclaimer, the term of this patent is extended or adjusted under 35 U.S.C. 154(b) by 0 days.

(21) Appl. No.: 13/989,506

(22) PCT Filed: Nov. 8, 2011

(86) PCT No.: PCT/EP2011/069656
§ 371 (c)(1),
(2), (4) Date: Jul. 31, 2013

(87) PCT Pub. No.: WO2012/072382
PCT Pub. Date: Jun. 7, 2012

(65) Prior Publication Data

US 2014/0052279 A1 Feb. 20, 2014

Related U.S. Application Data

(60) Provisional application No. 61/417,471, filed on Nov. 29, 2010.

(30) Foreign Application Priority Data

Nov. 29, 2010 (NL) ..................................... 2005772

(51) Int. Cl.
*A63F 13/00* (2014.01)
*G07C 1/24* (2006.01)
(Continued)

(52) U.S. Cl.
CPC ............ *G07C 1/24* (2013.01); *A63B 24/0021* (2013.01); *A63B 71/0605* (2013.01);
(Continued)

(58) Field of Classification Search
CPC ... G07C 1/24; G07C 1/22; G07C 1/00; G07C 3/00; A63B 2024/0025
(Continued)

(56) References Cited

U.S. PATENT DOCUMENTS 3,714,649 A * 1/1973 Brouwer et al. ................ 342/44
5,091,895 A 2/1992 Chatwin
(Continued)

FOREIGN PATENT DOCUMENTS

CN 101025834 A 8/2007
NL 247838 8/1996
(Continued)

OTHER PUBLICATIONS

Technology Team MYLAPS sports timing, "Whitepaper BibTag System (UHF)", Dec. 22, 2009, p. 1-10.*
(Continued)

*Primary Examiner* — Jay Liddle
*Assistant Examiner* — Ryan Hsu
(74) *Attorney, Agent, or Firm* — Steven M. Koehler; Westman, Champlin & Koehler, P.A.

(57) ABSTRACT

The disclosure relates to a method and system for detecting an event on a sports track. By applying one or more track segments across the width of the sports track and detecting passage of participants for the track segments, a comparison can be made between detected passage results and known passage results that may e.g. be available from a storage internal or external to the system. A deviation between the detection results and the known results that exceeds a particular deviation margin may be used as an immediate sign of an irregularity occurring during the sports event. The irregularity may e.g. relate to malfunctioning of one or more components of the time monitoring system or to deviating behavior by a participant to the sports event.

22 Claims, 7 Drawing Sheets

(51) Int. Cl.

| | |
|---|---|
| ***A63B 24/00*** | (2006.01) |
| ***A63B 71/06*** | (2006.01) |
| *G07C 1/00* | (2006.01) |
| *G07C 1/22* | (2006.01) |
| *G07C 3/00* | (2006.01) |
| *A63B 69/00* | (2006.01) |

(52) U.S. Cl.
CPC ... *A63B 69/0028* (2013.01); *A63B 2024/0025* (2013.01); *A63B 2220/62* (2013.01); *A63B 2220/836* (2013.01); *A63B 2225/15* (2013.01); *A63B 2225/20* (2013.01); *A63B 2225/50* (2013.01); *A63B 2244/18* (2013.01); *G07C 1/00* (2013.01); *G07C 1/22* (2013.01); *G07C 3/00* (2013.01)

(58) Field of Classification Search
USPC .......................................................... 463/59
See application file for complete search history.

(56) References Cited

U.S. PATENT DOCUMENTS

| | | | | |
|---|---|---|---|---|
| 5,103,433 | A * | 4/1992 | Imhof | 368/9 |
| 5,241,487 | A * | 8/1993 | Bianco | G04F 8/08 340/323 R |
| 5,511,045 | A | 4/1996 | Sasaki | |
| 5,671,010 | A * | 9/1997 | Shimbo et al. | 348/157 |
| 5,970,882 | A * | 10/1999 | Smith | A63H 18/12 104/295 |
| 6,545,705 | B1 * | 4/2003 | Sigel et al. | 348/157 |
| 7,046,125 | B2 * | 5/2006 | Fugit | B60Q 1/50 340/323 R |
| 2003/0235116 | A1 * | 12/2003 | Stobbe | 368/3 |
| 2004/0257294 | A1 * | 12/2004 | Bernard | G01V 15/00 343/866 |
| 2008/0232688 | A1 * | 9/2008 | Senior | G01S 3/7864 382/181 |
| 2008/0269644 | A1 | 10/2008 | Ray | |
| 2010/0056238 | A1 * | 3/2010 | Terrell, II | A63H 18/00 463/6 |
| 2010/0265801 | A1 * | 10/2010 | Ehelen | G07C 1/24 368/9 |
| 2012/0025944 | A1 * | 2/2012 | Hansen | 340/3.21 |
| 2012/0072172 | A1 * | 3/2012 | Howell | 702/178 |
| 2012/0082007 | A1 * | 4/2012 | Duxbury | 368/10 |
| 2012/0188381 | A1 * | 7/2012 | Vanuytven | G07C 1/24 348/180 |

FOREIGN PATENT DOCUMENTS

| | | |
|---|---|---|
| WO | WO 90/01752 | 2/1990 |
| WO | WO 97/34262 | 9/1997 |
| WO | WO 2008/134583 | 11/2008 |
| WO | WO 2009/011600 | 1/2009 |

OTHER PUBLICATIONS

"Periodical check of the detection loop", May 20, 2010, p. 1.*
Blackburn et al., "USA Track & Field 2012 Competition Rules", Feb. 14, 2012, USATF, p. 54-56.*
European Search Report and Written Opinion of the European Patent Office Patent Office in counterpart foreign application No. PCT/EP2011/069656 filed Nov. 8, 2011.
Office Action dated Jul. 27, 2015 for corresponding Japanese application No. 2013-540296, filed Nov. 8, 2011.
Chinese Office Action for corresponding Chinese Application with Application No. 201180058372.4, dated Mar. 25, 2015.

* cited by examiner

METHOD AND SYSTEM FOR DETECTING AN EVENT ON A SPORTS TRACK

CROSS-REFERENCE TO RELATED APPLICATION

This application is a Section 371 National Stage Application of International Application PCT/EP2011/069656 filed Nov. 8, 2011 and published as WO 2012/072382 A1 in English.

FIELD OF THE INVENTION

The present disclosure relates to a method and system for detecting an event on a sports track. More particularly, the present disclosure relates to a method and system for detecting malfunctioning of time monitoring equipment used for time monitoring at active sports events performed on a sports track, such as running events and ice-skating.

BACKGROUND OF THE INVENTION

The discussion below is merely provided for general background information and is not intended to be used as an aid in determining the scope of the claimed subject matter.

Methods and systems for time monitoring of participants of sports event have become increasingly advanced over the past decade.

MYLABS Sports Timing has published a Whitepaper BibTag System (UHF) with technical specifications for sports timing on a highly reliable time monitoring system. The system comprises a mat configuration comprising lightweight modular mats that can be secured to the ground and that segment the sports track across the width of the track. The mats each contain at least one antenna that is capable of high frequency communication with tags that participants wear on their chests. When a tag comes in the vicinity of a detection mat, the tag starts continuously sending out messages with a unique ID as a result of activation by the antennas in the mats. The antennas in the mat receive these messages with unique ID and transfer the messages to a decoder (an analyser). The decoder is connected to one or more of the mats and is generally positioned close to the mats (e.g. at or near the start line, intermediate line and/or finish line). The decoder is programmed to determine the passage time of the tag with a unique ID by using the received signal strength. Because the electromagnetic field produced by the antennas in the mats is strongest above the center of the mat, it becomes possible to determine the exact passing of the middle of the antenna using an appropriate algorithm in e.g. the decoder with a reasonable accuracy.

As a result of the emergence of such advanced systems of time monitoring, organizers and participants of sports events rely increasingly on these systems and, hence, require adequate and robust operation throughout the event. Therefore, in time monitoring systems such as the MYLAPS system described above, it is crucial that failure or malfunctioning of a track segment equipped for time monitoring is detected as soon as possible.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A method for detecting an event on a sports track during a sports event is disclosed. The sports track is segmented in one or more track segments across the width of the sports track. The one or more track segments may be positioned on a line substantially perpendicular to the preferential direction of movement on the sports track by the participant to the sports event. The assembly of the one or more track segments may substantially span the complete width of the sports track.

The passage of the participants to the sports event is detected for each of the one or more track segments to obtain at least one track segment passage result for each of the one or more track segments. A track segment passage result may e.g. be the number of participants having passed the track segment within a particular time interval. The obtained track segment passage results are compared with known track segment passage results for the same track segment. The known track segment passage result may e.g. be calculated by, be stored in or be available at the system. An event is detected on the sports track when the obtained track segment passage result deviates by at least a deviation margin from the known track segment passage result for the at least one track segment. The steps may e.g. be performed by a decoder (an analyser) receiving the detection signals from the track segments or a connected system.

The disclosure also relates to a computer program for performing the method and to the use of the method to detect malfunctioning of time monitoring equipment on the sports track.

A system for detecting an event on a sports track during a sports event is also disclosed. The sports track comprises one or more track segments positioned across the width of the sports track as mentioned above. The system contains at least one detector configured for detecting passage of participants of the sports event for each of the one or more track segments to obtain at least one track segment passage result for each of the one or more track segments. The system also comprises a comparator configured for comparing at least one of the obtained track segment passage results with a known track segment passage result for the same track segment. An analyser is configured for determining whether the obtained track segment passage result deviates by at least a deviation margin from the known track segment passage result for the at least one track segment in order to detect the event on the sports track.

By providing one or more track segments across the width of the sports track and detecting passage of participants for the track segments, a comparison can be made between detected passage results and e.g. expected/predicted/statistical/computed (i.e. known) passage results that may e.g. be available from a storage internal or external to the system. A deviation between the detection results and the known results that exceeds a particular deviation margin may be used as an immediate sign of an event, e.g. an irregularity, occurring during the sports event. The irregularity may e.g. relate to malfunctioning of one or more components of the time monitoring system (e.g. a mat or a decoder module) or to deviating behavior by a participant (e.g. a participant lying on the ground such that other participants are forced to change their preferred direction of movement). As a consequence, by using the (tags worn by the) participants themselves for obtaining passage detection results and comparing these with known passage results, information can be obtained quickly on events occurring during the sports events and allow immediate action. The detection of a deviation or the deviation a such may also be based on analysis of a first- or second order derivative.

It should be appreciated that, as used herein, a participant to the sports event comprises any object participating to the sports event and is not necessarily restricted to a human being. Objects may include devices applied by human beings, such as bicycles, sports cars, motors, boats, etc.

It should further be appreciated that tracks can be segmented across the width in various ways and that the segmentation is not necessarily a constructional segmentation. The track segmentation function may or may not coincide with the detection function to obtain the track segment passage result. An example of a constructional segmentation of the sports track coinciding with the detection function comprises a plurality of mats accommodating antennas for (electro)magnetic detection of the passage of participants to the sports event.

It should also be appreciated that, apart from using electromagnetic communication between a participant and the system using transponders, other forms of detection, including optical detection by light, electrical detection, magnetic detection, heat detection, ultrasonic detection, mechanical detection (e.g. pressure), electromechanical detection (e.g. piezo-electric sensors), computer-assisted field-of-view detection (e.g. using a camera virtually segmenting the field-of-view of the camera in track segments) etc. may be used in addition or as alternatives.

It should further be noted that in case of multiple track segments, the track segments may be positioned adjacent to each other substantially spanning the full width of the sports track. As an example, the plurality of track segments is provided on a line perpendicular to the preferential direction of motion of the participants to the sports event. The event to be detected is an event occurring at or in the direct proximity of the track segment.

The comparison of the detected track segment passage results and the known results can be performed in a variety of ways, including (but not limited to) a comparison with a particular function (e.g. a distribution curve), a comparison with history data (e.g. from a data base that is frequently updated with fresh data), a comparison with previously obtained data, a comparison with another track segment (e.g. an adjacent track segment), a comparison with a constant value, etc.

As used herein, a deviation margin between the obtained track segment passage result and the known track segment passage result defines a threshold criterion wherein complying with the criterion would not result in detecting an event whereas not complying with the criterion would trigger an event detection (or vice versa, depending on the definition of the criterion). The deviation margin may be set to zero, but will usually be set at a higher value to account for fluctuations from the expected behavior of the participants that is not necessarily a sign of an event during the sports race (e.g. a percentage deviation from e.g. a expected average or distribution).

Furthermore, as used herein, a sports track may either be a closed-loop sports track (e.g. used in short distance athletics or ice-skating) or an open sports track (e.g. applicable to marathon or cross country runs).

It should be noted that in one embodiment, only a single track segment (e.g. an inductive measurement loop) is provided across the width of the sports track. In this embodiment, obtained track segment passage results for a time interval can be compared with a known track segment passage distribution for the corresponding time interval. The event is detected when the obtained track segment passage results deviate from the known track segment passage distribution by a time deviation margin. The duration of the time interval may be selected, dependent on what events the operator desires to detect. The duration of the time interval may be selection from the range of e.g. 1 second to the duration of the sports event.

It should also be noted that, in one embodiment, the detected and known track segment passage results may relate to the number of passages detected and known for the track segment(s), including derivatives and equivalents of these numbers.

In an embodiment, the obtained track segment passage results for a plurality of track segments are compared with known track segment passage results for a corresponding plurality of track segments. The event is detected when (a distribution of) the obtained track segment passage results deviate(s) from a known distribution of the known track segment passage results by a threshold deviation. The deviation may e.g. relate to a significant deviation from an expected (known) statistical distribution, such as a (discrete) Gaussian distribution. By relating the detection results to known distributions, event detection is facilitated.

It is not necessary that a deviation is detected for each of the track segments individually and/or that each deviation for a track segment results in an individual detection (and alert or data communication) of an event. Results from the method and system for various track segments may be combined to result in a single event detection and/or alert/data communication.

In an embodiment, the width of the sports track is segmented into fewer than fifty track segments. The number of track segments is dependent on the width of the sports track and a balance should be found between the passage resolution that is desired across the width of the track and the number of track segments that can e.g. be connected to a decoder/analyser. Generally, the number of track segments may be selected based on the (average) width of the participant to the sports event as to enable passage detection for only a single track segment.

In an embodiment, the track segments are obtained by applying mats that can be secured to the ground and that segment the sports track across the width of the track. The mats each contain at least one antenna that is capable of e.g. high frequency electromagnetic or low frequency magnetic communication with tags that participants wear on their chests or in/on their shoes, respectively. The mats may or may not be partly sunk into the sports track and may contain anti-slip coating to avoids that the mats get slippery when wet.

In an embodiment, the detection of an event triggers an alert signal. The alert signal may warn the operator of the system of an event. In an embodiment the event relates to operation of a detection system for detecting the passage of the participants of the sports event. The alert signal, possibly combined with status and/or failure information, may be transmitted wirelessly to an operator device (e.g. a smart phone or a laptop computer) of the operator such that physical proximity to the system is not required. In an embodiment, the operator device is operable to modify system settings or to reset the system in an attempt to restore correct operation of the system without requiring direct manual operation by the operator.

Generally, the alert signal can be used for a variety of purposes, including control purposes for a particular device. Examples include a calling system for emergency calls or a control system for controlling camera orientation such that detection of an event automatically causes the camera to turn to or zoom in the direction where the event was detected.

In an embodiment, a first one or more track segments is provided across the width of the sports track at a first position along the sports track and a second one or more track segments is provided across the width of the sports track at a second position along the sports track. The first and second track segments may be at different positions in the direction along the sports track. Whereas in previous embodiments, the event to be detected is an event occurring at or in the direct proximity of the track segment, the present embodiment allows to detect an event between the first one or more track segments and the second one or more track segments. In particular, such an event is detected when a known distribution of track segment passage results of the first one or more track segments deviates by a deviation margin from an obtained distribution of track segment passage results of the second one or more track segments. The known distribution of track segment passage results may be obtained from detecting the passage of participants of the first one or more track segments.

In a particular example of this embodiment, the first and second track segments are provided close to each other, e.g. with a distance of 10 meters (e.g. 3 or 5 meters). Such a configuration is typically applied near a finish line where the first one or more track segments constitute the main finish line and the second one or more track segments constitute a backup finish line. The deviation margin between the track segment passage results of these two lines can be set rather low and any deviation in location or time exceeding the deviation margin is very likely to be due to an event (e.g. malfunction or an accident) that is detected.

It should be noted that an event may be related to a particular participant in case the participant is identified during the passage of the track segment, e.g. by the unique ID from a transponder.

Hereinafter, embodiments of the invention will be described in further detail. It should be appreciated, however, that these embodiments may not be construed as limiting the scope of protection for the present invention.

DETAILED DESCRIPTION OF THE ILLUSTRATIVE EMBODIMENTS

Figure 1A:
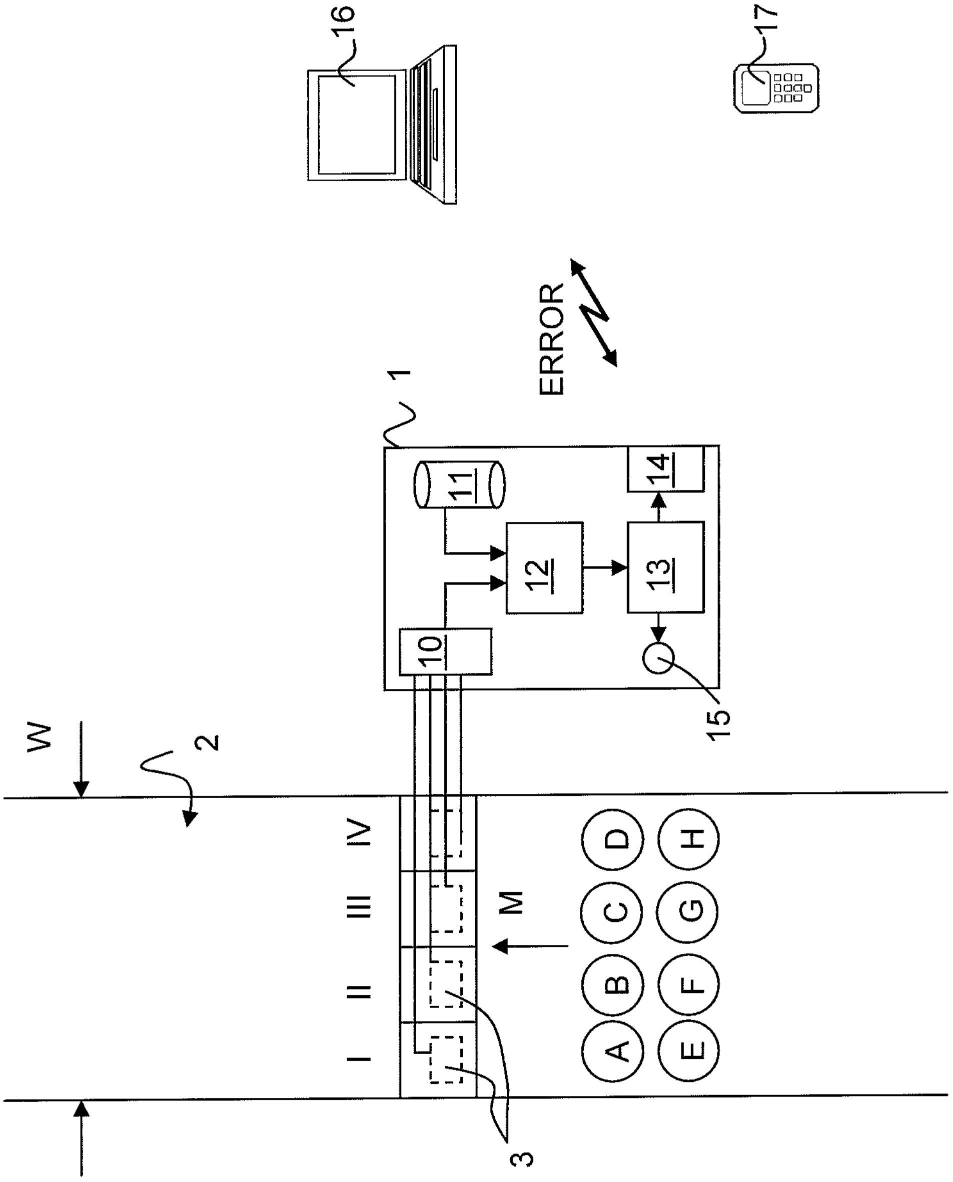
FIGS. 1A and 1B are top-view schematic illustrations of a system for detecting events on a sports track according to embodiments of the invention.

FIG. 1A depicts a schematic illustration of a system 1 for detecting an event on a sports track 2 (only a part is shown) during an active sports event. The sports track 2 may either be a closed-loop sports track (e.g. used in short distance athletics or ice-skating) or an open sports track (e.g. applicable to marathon or cross country runs).

It will be assumed in the remainder of the disclosure that the sports event is a running event, however, without the invention being limited to such sports events. Participants A-H are assumed to participate in the running event. It should be appreciated the participants A-H may represent many participants, ranging from e.g. ten to several thousands or ten thousands during a mass running event.

The sports track 2 is segmented across the width W of the sports track 2 by tracks segments I-IV. Track segments I-IV are positioned in line and adjacent to each other to span the width W of the sports track 2 in a manner perpendicular to the preferential direction of motion M by participants A-H. The track segments I-IV are provided on the start/finish line for the running event. Track segments I-IV, however, may also be provided at intermediate positions on the sports track 2 in order to obtain information on interim times. It should be noted that, whereas FIG. 1A shows a segmentation of the sports track 2 into four segments, the width W of the sports track 2 may be segmented into e.g. fewer than fifty track segments, e.g. two, four, eight, ten, twelve, sixteen, twenty, thirty, or forty segments or any number in between. The number of track segments I-IV is dependent on the width W of the sports track and a balance should be found between the passage resolution that is desired across the width W of the track and the number of track segments that can e.g. be connected to the system 1. Generally, the number of track segments may be selected based on the (average) width of the participant to the sports event as to enable passage detection for only a single track segment.

The track segments I-IV are constructional segments I-IV that each include a detector 3 coinciding with one of the track segments I-IV. The track segments I-IV may e.g. be mats that contain antennas as detectors 3 for electromagnetic detection of the passage of participants A-H to the running event.

The track segments I-IV may also be provided as other types of constructional segmentation of the sports track 2, e.g. wall-bounded corridors or segments arranged above the start/finish line wherein the participants pass underneath the segments. It should also be appreciated that, apart from using electromagnetic communication between a participants A-H and the system 1, other forms of detection, including optical detection by light, electrical detection, magnetic detection, heat detection, ultrasonic detection, mechanical detection (e.g. pressure), electromechanical detection (e.g. piezo-electric sensors), computer-assisted field-of-view detection (e.g. using a camera virtually segmenting the field-of-view of the camera in track segments) etc. may be used in addition or as alternatives.

Regardless of the applied method(s) of detection is(are), the passage of participants A-H to the sports event is detected for each of the track segments I-IV. In FIG. 1A, it is shown that each detector 3 is communicatively connected (either wired or wireless) to the system 1 in order to obtain a track segment passage result for each of the track segments I-IV. The track segment passage result, e.g. a number of participants be detected to pass a particular track segment I-IV, may either be obtained from the track segment I-IV or be computed in the system 1 on the basis of detection signals received from each of the detectors associated with track segments I-IV.

An example of signal processing may relate to distinguishing whether a participant A-H should be assigned to one track segment or to an adjacent track segment. This may e.g. be an issue when electromagnetic detection is applied, since electromagnetic signals from participants A-H may be detected by multiple antennas. One way of assigning participants to a track segment I-IV is based on strongest signal detection. Other algorithms may be applied that include a function of signal strength, time and/or other physical parameters.

In the embodiment of FIG. 1A, a processor 10 receives and processes detection signals from the track segments I-IV to obtain a track segment passage result for each of the track segments I-IV. The system 1 further contains a database 11 with known track segments passage results for each of the track segments I-IV or any other means for making available known track segment passage results e.g. by computation. As an example, the known track segment passage results may be computed as a function or be based on historical and/or actual race data and may e.g. be complemented with other data related to the type of sports event, the weather, the number of participants, the development of the sports event etc. A comparator 12 is configured for comparing at least one of the obtained track segment passage results from a track segment I-IV with a known track segment passage result obtained from the database or other means 11 for the same track segment I-IV. An analyser 13 is provided that is configured for determining whether the obtained track segment passage result for the track segment I-IV deviates by at least a deviation margin from the known track segment passage result from the database 11 for the at least one track segment in order to detect the event on the sports track.

In the embodiment of FIG. 1A, the system 1 further contains system outputs 14, 15. System output 14 is a transmitter configured for wirelessly transmitting information to operator devices, such as laptop 16 or smart phone 17. System output 15 may be a display, illumination component, audio-output, etc. System output 14, 15 may output an alert signal ERROR when the system 1 detects an event. The alert signal warns the operator of the system 1. In the embodiment of FIG. 1A the event relates to operation of a detection system for detecting the passage of the participants of the sports event. The alert signal, possibly combined with status and/or failure information, is transmitted wirelessly to laptop 16 or smart phone 17 of the operator such that physical proximity to the system 1 is not required. In an embodiment, the operator device 16, 17 is operable to modify system settings or to reset the system 1 in an attempt to restore correct operation of the system 1 without requiring direct manual operation by the operator.

The system outputs 14, 15 may also be used for data communication purposes in order to perform one or more functions of the system 1 at a remote location. An example of such an embodiment is disclosed in FIG. 1B.

Figure 1B:
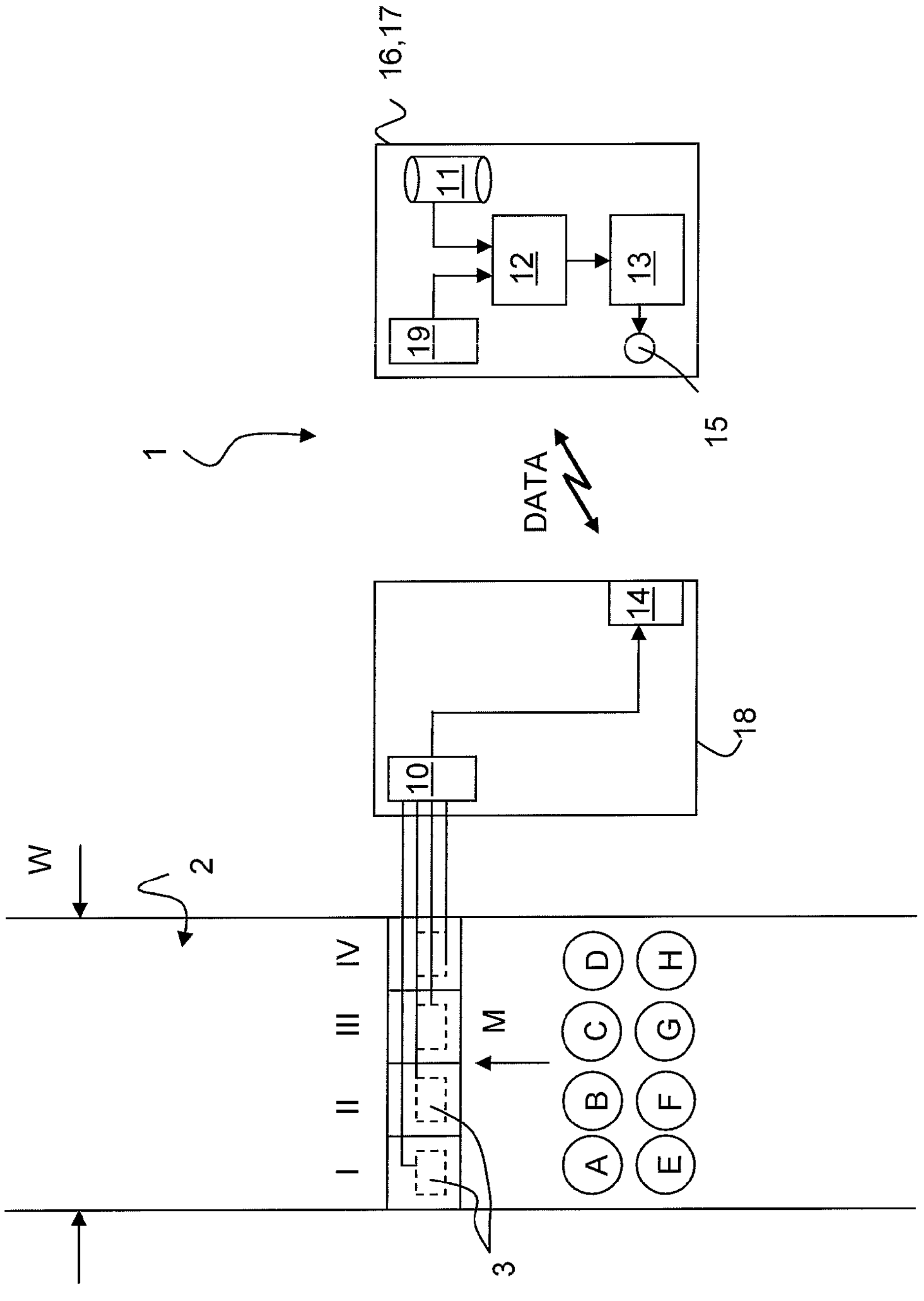

In the system of FIG. 1B the system 1 contains a detection system 18 and a remote analysis device, e.g. a laptop 16 or a smart phone 17. Part of the intelligence for the event detection has been relocated to the remote analysis device 16, 17. In particular, the detection system 18 comprises a receiver/processor 10 that receives and processes detection signals from the track segments I-IV to obtain a track segment passage result for each of the track segments I-IV. Receiver/processor 10 may either receive the track segment passage results from the track segments or compute the track segment passage results from the detection signals received from detectors 3. The results (i.e. data) are then, in contrast to the embodiment of FIG. 1A, forwarded to the remote analysis device 16, 17 using system output 14 as indicated by the DATA link in FIG. 1B. The link may either be a wired or wireless direct link (using e.g. Ethernet or Bluetooth) or via a wireless access network (e.g. a WLAN or a GPRS/UMTS/LTE network) Alternatively, receiver/processor 10 may directly forward the received signals (either unprocessed or pre-processed) from detectors 3 to remote analysis device 16, 17 in order to obtain the detected track segment passage results for the track segments I-IV at the remote location.

Remote analysis device 16, 17 contains a receiver 19 for receiving the data communication from detection system 18. The device 16, 17 contains or has access to a database 11 with known track segments passage results for each of the track segments I-IV. A comparator 12 in the device 16, 17 is configured for comparing at least one of the obtained track segment passage results from a track segment I-IV with a known track segment passage result obtained from the database 11 for the same track segment I-IV. An analyser 13 in the device 16, 17 is provided configured for determining whether the obtained track segment passage result for the track segment I-IV deviates by at least a deviation margin from the known track segment passage result from the database 11 for the at least one track segment in order to detect the event on the sports track.

It should be appreciated that in the embodiments of FIGS. 1A and 1B, several of the functions described for processor 10, database 11, comparator 12 and analyser 13 can be combined in one module and/or may be implemented as software running on a processor. One embodiment of the invention may be implemented as a non-transitory program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM, DVD, BlueRay disks readable by appropriate drives, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

It should be appreciated that the known track segment passage results may, instead of being electronically available from e.g. database 11, also be known (i.e. expected or predicted) by a human being (e.g. the operator of the system 1) on the basis of his experience or history data from previous sports events. In such an embodiment, the operator may e.g. simply observe the detected track segment passage results on a display 15 (either graphically, e.g. as a bar chart with bars for each track segment, or numerically) and be alerted by a deviation in these results from what he would expect in a normal situation.

Figure 2:
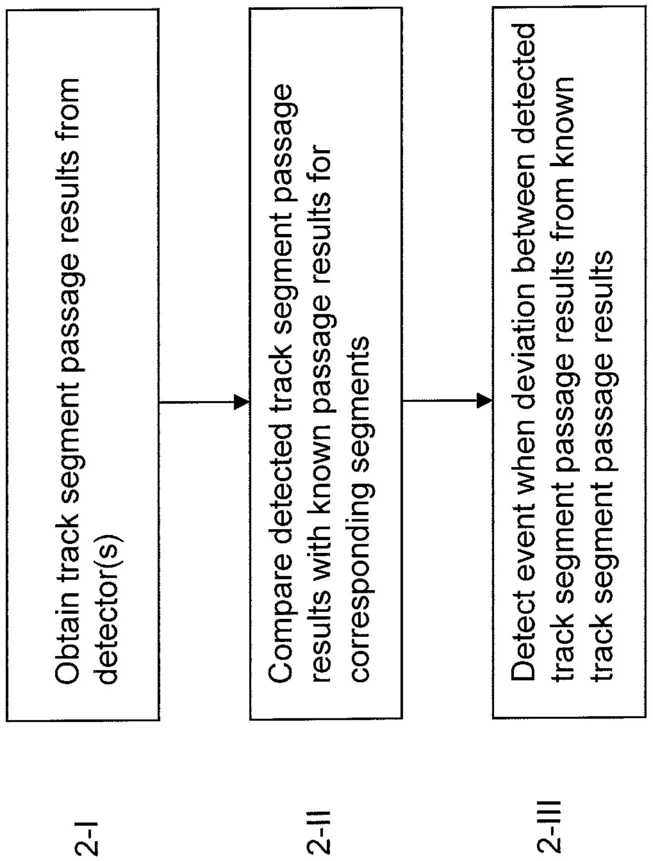
FIG. 2 is a flow chart illustrating steps of a method for detecting an event according to an embodiment of the invention.

FIG. 2 is a flow chart showing steps for operating the system 1 of FIGS. 1A and 1B in order to detect an event (e.g. the malfunctioning of a detector 3) on the sport track 2 during the running event. As already exemplified with reference to FIGS. 1A and 1B, different steps could be performed in different devices.

In a first step 2-I, detector 3 of each track segment I-IV detects passage of participants A-H in order to obtain track segment passage results for each of the track segments I-IV. The track segment passage result is e.g. the number of participants (or a derivative or equivalent thereof) assigned to a track segment I-IV. As mentioned above, a participant A-H may be assigned to a track segment I, II, III or IV on the basis of signal strength or another algorithm.

In a second step 2-II, the obtained track segment passage results are compared with a known track segment passage result for the same track segment. Known track segment passage results may be stored in a storage available to the system 1, be compute or may result from knowledge by the operator of the system 1.

In a third step 2-III, an event is detected when the obtained track segment passage result for each track segment I-IV deviates by at least a deviation margin from the known track segment passage result for the corresponding track segments I-IV. The deviation margin between the obtained track segment passage result and the known track segment passage result is a threshold criterion wherein complying with the criterion would not result in detecting an event whereas not complying with the criterion would trigger an event detection (or vice versa, depending on the definition of the criterion). The deviation margin may be set to zero, but will usually be set at a higher value or percentage to account for fluctuations from the expected behavior of the participants that is not necessarily a sign of an event during the sports race.

Thus, by applying a plurality of track segments I-IV across the width W of the sports track 2 and detecting passage of participants for the track segments, a comparison can be made between detected passage results and e.g. expected/predicted/statistical/computed (i.e. known) passage results that may e.g. be available from a storage internal or external to the system or be computed or estimated. It should be noted that, as indicated above, the comparison can also be made visually by displaying (e.g. graphically or in numerical values) the detected track segment passage results on a screen of e.g. operator devices 16, 17 followed by the operator recognizing on the basis of e.g. his experience that detected results deviate significantly from what one would normally expect. A deviation between the detection results and the known results that exceeds or is otherwise outside a particular deviation margin may be used as an immediate sign of an irregularity occurring during the sports event. The irregularity may e.g. relate to malfunctioning of one or more components of the time monitoring system (e.g. a detector 3 or the processor 10) or to deviating behavior by a participant A-H (e.g. a participant lying on the ground such that other participants are forced to change their preferred direction of movement).

Whereas the present disclosure allows for event detection by comparing absolute numbers for the detected track segment passage results and the known track segment passage results for one or more of the track segments, generally monitoring detected track segment passage results and comparing these with known track segment distributions is efficient. The distribution may be a distribution in time and/or in location across the width W of the sports track 2. In one embodiment of using distributions, as will be apparent from the below examples, the detected track segment passage results may be compared with a known track segment distribution profile to detect the event.

Figure 3:
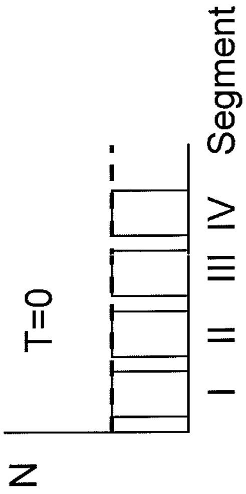
FIGS. 3-5 are examples of performing the method illustrated in FIG. 2 according to embodiments of the invention.
Figure 4:
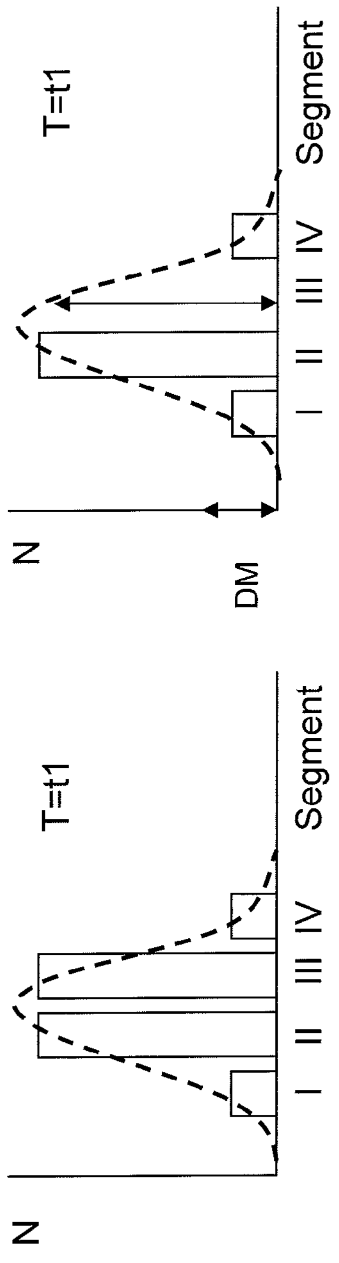
Figure 5:
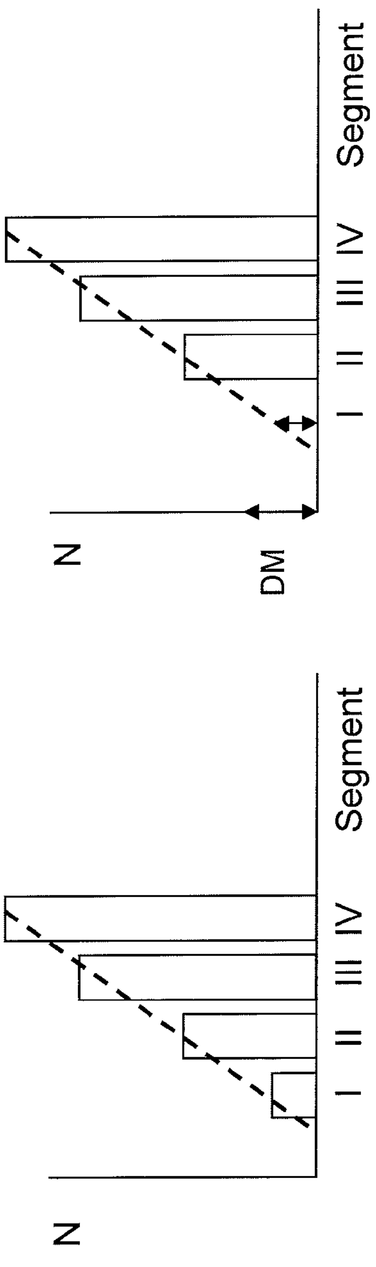

FIGS. 3-5 are examples of the method schematically illustrated in the flow chart of FIG. 2.

In FIG. 3 a chart is depicted showing the detected track segment passage results N (vertical axis) for each of the track segments I-IV (horizontal axis) at the start of the race (T=0). Such a chart may e.g. be displayed on display 15 of a remote analysis device 16, 17. In the case illustrated in FIGS. 1A and 1B, the number N of detected participants A-H will be equal for each track segment (indicated by the bars of equal height for each track segment I-IV) at the start of the race. The expected distribution profile (the dashed bold line, which is not necessarily displayed) is substantially flat, as is generally expected since in a running race with a large number of participants A-H, the participants will normally align with the start line across the full width W of the sports track 2.

At a later time t1 during the race event, the field of participants may have spread and an expected track segment passage distribution profile may be as depicted by the dashed bold lines in FIG. 4. The majority of the participants will, (depending on the circumstances, see FIG. 5 referred to below) cross the line with track segments near the center of the track 2 and will, hence, be detected by detectors 3 associated with track segments II and III. Fewer participants will pass, and thus be detected by the detectors 3 at, the edges of the track 2. Such a normal distribution is therefore a good reference for adequate detection.

In the left-hand diagram of FIG. 4, the detected track segment passage results comply with the known track segment passage distribution profile at a time t1 during the race (i.e. there is no significant deviation with respect to the set deviation margin DM) and, consequently, an event is not detected. In the right-hand diagram, however, no detection result is obtained for the third track segment III. As can be inferred from the known distribution profile and as is shown in the left-hand diagram of FIG. 4, detector 3 associated with track segment 3 is expected to detect a considerable number of participant passages and, consequently, an event is detected (e.g. related to the malfunction of the detector 3 for track segment III) since the deviation from the known distribution is greater than deviation margin DM. The event detection may cause transmission of an ERROR signal to a smart phone 17, as depicted in FIG. 1A. The operator of smart phone 17 may in response check the status of the detector 3 and the associated electronics and, possibly, reset or modify setting of the detection system at an appropriate moment in time. Alternatively, as explained with reference to FIG. 1B, the right-hand diagram of FIG. 4 may be displayed on the display of the laptop 16 or smart phone 17 (with or without the normal distribution profile) and, accordingly, trigger the operator to act as described previously.

Whereas in FIGS. 3 and 4, the detection of events is described on the basis of deviation in place (location) from known passage results in the direction of the width W of the sports track 2, the same FIGS. also allow for detecting an event on the basis of a deviation in time from known passage results. FIG. 3 depicts the detected track segment passage results at T=0, whereas FIG. 4 depicts these results at a different time T=t1. For the outer track segments I and IV, the number of passages by participants is expected to decrease from T=0 to T=t1, whereas for the inner track segments II and III, the number is expected to increase. A deviation from this known behavior may cause an event detection when the deviation exceeds a time deviation margin (not shown).

The expected track passage distribution profile may depend on the particular circumstances of the race and/or on the location of the detection line as will now be explained with reference to FIG. 5. In case participants A-H are exposed to wind near the detection line, participants A-H may seek shelter during the race and run close to the edges of the track 2. Consequently, the detected track segment passage results for track segments I-IV may look more like the bars shown in the left-hand diagram of FIG. 5. Whereas the detected track segment passage results deviate significantly from the normal distribution as depicted in FIG. 4, this deviation can obviously not be attributed to malfunctioning of the detection system. The expected track segment distribution profile, indicated by the dashed bold line, should therefore be adapted to the circumstances of the race. The same would be true when the detection line would be located in a curve of a race track 2, since the majority of the participants would generally prefer running close to the inner edge of the curved track to minimize effort. In the right-hand diagram of FIG. 5, it can be seen that no passage results are detected for track segment I. The deviation margin DM is set such, however, that an event detection is not triggered.

Figure 6:
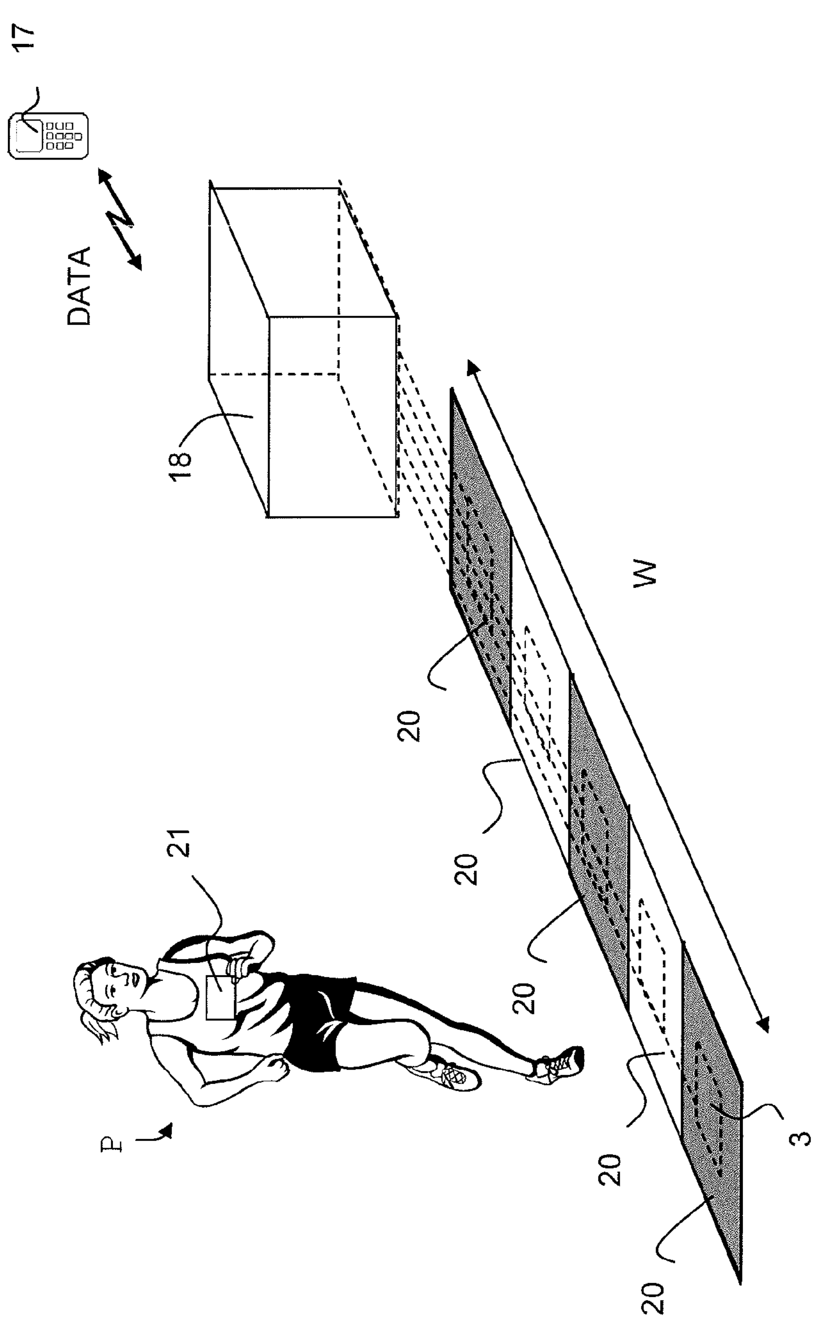
FIG. 6 is schematic illustration of a practical application of the system of FIG. 1B.

FIG. 6 is a schematic illustration of a practical system wherein the track segments are provided as mats 20 over which a participant P runs. The lightweight modular mats 20 are secured to the ground and segment the sports track 2 across the width W of the track. The mats 20 each contain at least one antenna (comparable to detector 3 in FIG. 1B) that is capable of high frequency communication with tags 21 that participants P wear on their chests. When a tag 21 comes in the vicinity of a detection mat 20, the tag 21 starts continuously sending out messages with a unique ID as a result of activation by the antennas 3 in the mats 20. The antennas 3 in the mat 20 receive these messages with unique ID and transfer the messages to a decoder 18. The decoder 18 is connected to one or more of the mats 20 and is generally positioned close to the mats (e.g. at or near the finish line). The decoder 19 is programmed to determine the passage time of the tag 21 with a unique ID by using the received signal strength. Because the electromagnetic field produced by the antennas in the mats is strongest above the center of the mat, it becomes possible to determine the exact passing of the middle of the antenna using an appropriate algorithm in e.g. the decoder 23 with a reasonable accuracy. The detected mat passage results are sent over a data link to a remote analysis device 17 for further analysis as described above. Events can be related to a particular participant using e.g. a unique identifier from the tag 21.

Figure 7:
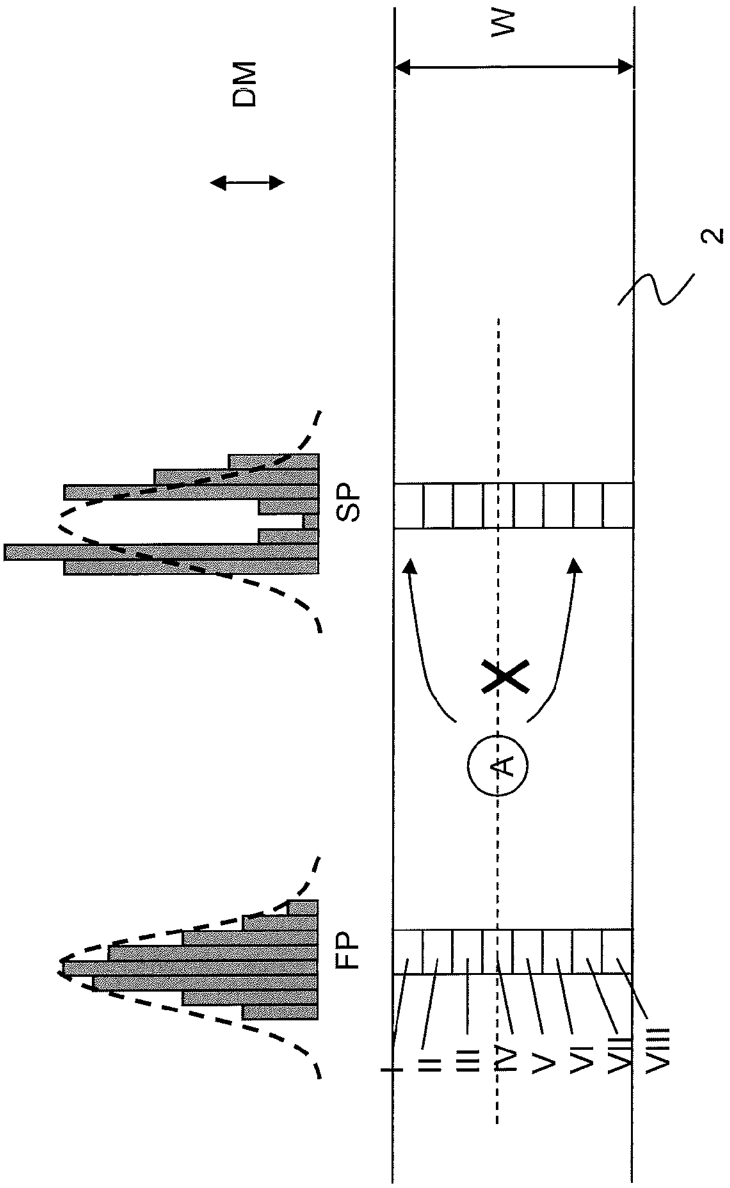
FIG. 7 is a top-view schematic illustration of a further embodiment for detecting an event on a sports track.

FIG. 7 is a schematic illustration of the use of system 1 to detect events between two detection lines.

A first plurality of track segments I-VIII is provided across the width W of the sports track at a first position FP along the sports track 2 and a second plurality of track segments I-VIII is provided across the width W of the sports track 2 at a second position SP along the sports track 2. The first and second plurality of track segments are at different positions in the direction along the sports track. Whereas in previous embodiments, the event to be detected is an event occurring at or in the direct proximity of the track segments I-IV (e.g. the malfunction of a detector 3 in a mat 20), the present embodiment of FIG. 7 allows to detect an event between the first plurality of track segments I-VIII at position FP and the second plurality of track segments I-VIII at position SP. In particular, such an event is detected when a known distribution of track segment passage results for the first plurality of track segments I-VIII at position FP deviates by a deviation margin from obtained track segment passage results for the second plurality of track segments I-VIII at position SP. The known distribution of track segment passage results may be obtained from detecting the passage of participants of the first plurality of track segments.

As can be observed for FIG. 7, an obstacle (indicated by the bold cross) between the two lines of detection, causes participants A to deviate from their normal course (indicated by the dashed line). The normal course would yield an expected normal distribution (save from particular circumstances as explained with reference to FIG. 5) as indicated by the bold dashed line and detected by the track segment detectors of track segments I-VIII at the first portion FP. The deviation from the normal course is clearly observed in the detected results for the track segment detectors of track segments I-VIII at the second position SP. The deviation is greater than the deviation margin DM and therefore triggers an event detection.

In a particular example of this embodiment, the first and second track segments I-VIII are provided close to each other, e.g. with a distance of 10 meters (e.g. 3 or 5 meters). Such a configuration is typically applied near a finish line where the first one or more track segments constitute the main finish line and the second one or more track segments constitute a backup finish line. The backup finish line is a redundant line for time monitoring in case of malfunction of the main finish line.

The deviation margin between the track segment passage results of these two lines can be set rather low and any deviation in time or position exceeding the deviation margin is very likely to be due to an event (e.g. malfunction or an accident) that is detected. As an example, a particular participant A would normally not deviate from its normal course and/or normal speed unless an event occurs.

Figure 8:
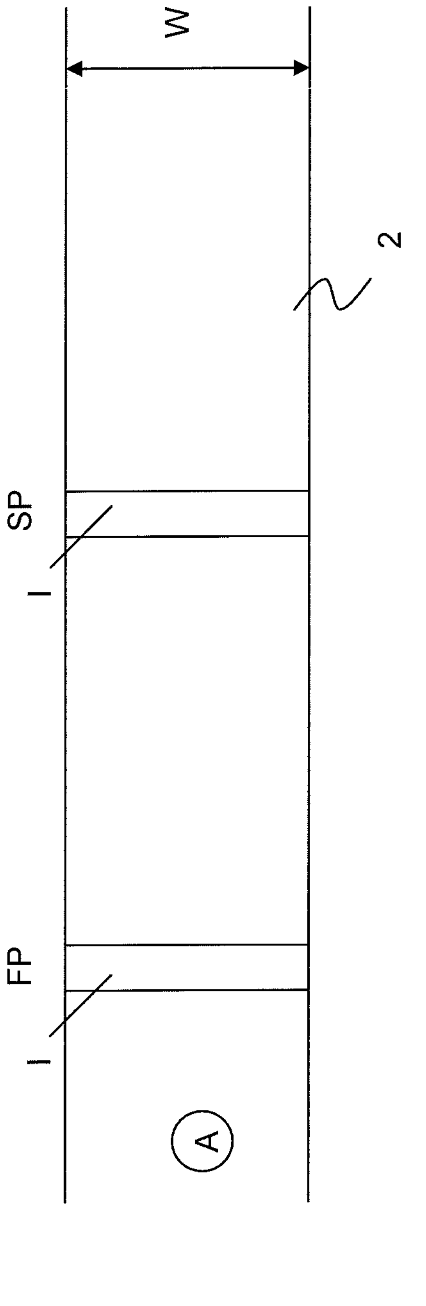
FIG. 8 is a top-view illustration of a still further embodiment for detecting an event on a sports track.

Finally, FIG. 8 is a schematic illustration of the use of a system 1, wherein the sports track comprises only a single track segment I (possibly at different positions FP, SP along the sports track 2). The track segment I may comprise an inductive measurement loop that communicates with transponders worn by participants.

The single track segment I is particular useful for detecting events based on observed deviations in time exceeding a particular time deviation margin. The following are example of using the configuration of FIG. 8

In one example, the pass flow of participants in time can be detected. At the start of a mass event, for example, the number of participants crossing the start line for the first time per minute is likely to be fairly constant and any deviation from this known/expected behavior in time for the first hour or so (depending, of course, on the number of participants) may be indicative of an event.

In another example, having multiple single track segments I at different positions along the sports track 2 (or equivalently, multiple passings of one track segment) allows for detecting events relating to the total number of participants. For example, when 100 participants are detected at a first line and 90 at a second line, an increase to 95 for a third line may cause an event detection when the time interval is set to the duration of the race. Another example relates again to the conventional configuration of a main finish line and a redundant backup line as described above.

In still another example, assuming the (average) speed of a participant is known, the time of passing of the detection loop at FP enables calculation of the expected time of passing at detection loop SP (these may actually be the same loop at a closed sports track) and, hence, allows for detecting an event once the participant is not detected at the expected time (assuming a deviation margin of zero). The particular participant to which the event relates can be known from e.g. the transponder ID.

The invention claimed is:

1. A method for detecting an irregularity on a sports track during a race, comprising:

providing a first set of at least two track segments, each of the track segments of the first set being adjacent to at least another one of the track segments of the first set such that the first set of at least two track segments extends completely across a width of the sports track;

providing a second set of at least two track segments, each of the track segments of the second set being adjacent to at least another one of the track segments of the second set such that the second set of at least two track segments extends completely across a width of the sports track, the second set of at least two track segments occurring at a different position along the sports track than the first set of at least two track segments;

starting the race after providing the first set of at least two track segments and the second set of at least two track segments;

monitoring the race using monitoring equipment used for time monitoring a race after starting the race and before an end of the race;

detecting with a processor that is coupled to the monitoring equipment, after starting the race and before the end of the race, passage of participants of the race for each of the track segments of the first set of at least two track segments and the second set of at least two track segments to obtain corresponding first track segment passage results and second track segment passage results, the passage of participants of the race being detected for each of the track segments separately for each of the first set of at least two track segments and the second set of at least two track segments, and the first track segment passage results including a number of participants having passed each track segment of the first set of at least two track segments within a first particular time interval, and the second track segment passage results including a number of participants having passed each track segment of the second set of at least two track segments within a second particular time interval;

comparing with the processor, after starting the race and before the end of the race, the first track segment passage results with the second track segment passage results, the first track segment passage results including a first distribution profile comprising a distribution in location across the width of the sports track for the track segments of the first set of at least two track segments, the second track segment passage results including a second distribution profile comprising a distribution in location across the width of the sports track for the track segments of the second set of at least two track segments, and the first distribution profile representing a number of expected participants for each track segment of the second set of at least two track segments;

detecting and outputting with the processor, after starting the race and before the end of the race, an irregularity on the sports track when the first track segment passage results deviate by at least a deviation margin from the second track segment passage results; and generating, after starting the race and before the end of the race, an alert signal in response to detecting the irregularity; and ending the race.

2. The method according to claim 1, wherein the deviation margin of the first track segment passage results from the second track segment passage results comprises a time deviation by at least a time deviation margin.

3. The method according to claim 2 and further comprising:

detecting the irregularity when the first track segment passage results deviate from the second track segment passage results by the time deviation margin.

4. The method according to claim 1, wherein the deviation margin comprises a location deviation margin.

5. The method according to claim 1 and further comprising selecting a width of each track segment based on a width of a participant.

6. The method according to claim 1 and further comprising performing at least said comparing at a remote analysis device.

7. The method accordingly to claim 1 wherein the comparison with the second track segment passage results includes a comparison against a distribution curve of the second track segment passage results.

8. The method accordingly to claim 1 wherein the comparison with the second track segment passage results includes a comparison against a discreet Gaussian distribution of the second track segment passage results.

9. The method accordingly to claim 1 wherein the second track segment passage results is constant after starting the race and before ending the race.

10. The method according to claim 1, wherein the monitoring equipment includes a plurality of mats, each of the plurality of mats comprising a detector which includes an antenna configured to detect electromagnetically passage of a participant in the race separately from other participants in the race.

11. The method according to claim 10, wherein the detection of a participant of the race occurs by electromagnetic communication between the antenna and a tag worn by the participant when the tag is near the antenna.

12. The method according to claim 11, further comprising the tag continuously communicating to the antenna, messages having a unique ID associated with the tag as a result of activation of the communication by the antenna when the tag is near the antenna.

13. The method according to claim 12, further comprising:

the antenna transferring the messages to a decoder, wherein the decoder is connected to a mat of the plurality of mats; and the decoder detecting a passage result having a period of time, when a tag with the unique ID passes the mat by using signal strength of the messages, wherein the signal strength of the messages is greatest when the participant passes the center of the mat due to an electromagnetic field produced by the antenna being the strongest above the center of the mat.

14. The method according to claim 13, further comprising the decoder communicating the passage result over a data link to the processor, wherein the processor uses the passage result in the detection of the passage of participants of the race for each of the first set of at least two track segments and second set of at least two track segments to obtain the first track segment passage results and the second track segment passage results.

15. A system for detecting an irregularity on a sports track during a race, wherein the sports track is segmented across a width of the sports track by track segments, the system comprising:

monitoring equipment used for time monitoring a race occurring on the sports track after starting the race and before an end of the race;

a first detector configured to detect, after a start of a race and before an end of the race, passage of participants of the race for each track segment of a first set of at least two track segments to obtain first track segment passage results for the first set of at least two track segments, each track segment of the first set of at least two track segments being adjacent to at least another track segment such that the first set of at least two track segments extends completely across a width of the sports track, the passage of participants of the race being detected for each track segment of the first set of at least two track segments separately, the first track segment passage results including a number of participants having passed each track segment of the first set of at least two track segments within a first particular time interval;

a second detector configured to detect, after a start of a race and before an end of the race, passage of participants of the race for each track segment of a second set of at least two track segments to obtain second track segment passage results for the second set of at least two track segments, each track segment of the second set of at least two track segments being adjacent to at least another track segment such that the second set of at least two track segments extends completely across a width of the sports track, the passage of participants of the race being detected for each track segment of the second set of at least two track segments separately, the second track segment passage results including a number of participants having passed each track segment of the second set of at least two track segments within a second particular time interval;

a comparator configured to compare, after the start of a race and before the end of the race, the first track segment passage results with the second track segment passage results, the second track segment passage results being a distribution profile comprising a distribution in location across the width of the sports track for the second set of at least two track segments, the distribution profile representing a number of expected participants for each track segment of the second set of the at least two track segments;

an analyser configured to determine and output, after the start of a race and before the end of the race, whether the first track segment passage results deviate from the second track segment passage results by a deviation margin in order to detect an irregularity on the sports track; and a generator configured to generate, after the start of a race and before the end of the race, an alert signal in response to detecting the irregularity.

16. The system according to claim 15, wherein the deviation margin of the first track segment passage results from the second track segment passage results comprises a time deviation by at least a time deviation margin.

17. The system according to claim 16, wherein:

the analyser is configured to detect the irregularity when the first track segment passage results deviate from the second track segment passage results by the time deviation margin.

18. The system according to claim 15, wherein the deviation margin comprises a location deviation margin.

19. The system according to claim 15, wherein a width of each track segment is selected based on a width of a participant.

20. The system according to claim 15, wherein the first set of at least two track segments comprise mats, each of the mats containing a detector configured to detect the passage of the participants of the race, and wherein the second set of at least two track segments comprise mats, each of the mats containing a detector configured to detect the passage of the participants of the race.

21. The system according to claim 15, wherein at least the comparator and the analyser are contained in a remote analysis device.

22. A non-transitory computer readable storage medium comprising instructions, which when executed by a processor instruct the processor to:

detect, after a start of a race and before an end of the race, on a sports track, passage of participants of the race for each of at least two track segments for each of a first set of track segments and a second set of track segments of the sports track to obtain corresponding first track segment passage results and second track segment passage results, each of the at least two track segments of the first set of track segments being adjacent to at least another one of the at least two track segments of the first set of track segments such that the first set of track segments extends completely across a width of the sports track, each of the at least two track segments of the second set of track segments being adjacent to at least another one of the at least two track segments of the second set of track segments such that the second set of track segments extends completely across the width of the sports track, the second set of track segments occurring at a different position along the sports track than the first set of track segments, the passage of participants of the race being detected for each of the at least two track segments separately for each of the first set of track segments and the second set of track segments, passage of the first set of track segments being monitored by monitoring equipment used for time monitoring the race, and the first track segment passage results including a number of participants having passed each track segment of the at least two track segments of the first set of track segments within a first particular time interval, and passage of the second set of track segments being monitored by the monitoring equipment used for time monitoring the race, and the second track segment passage results including a number of participants having passed each track segment of the at least two track segments of the second set of track segments within a second particular time interval;

compare, after the start of a race and before the end of the race, the first track segment passage results with the second track segment passage results, the first track segment passage results including a first distribution profile comprising a distribution in location across the width of the sports track for the at least two track segments of the first set of track segments, the second track segment passage results including a second distribution profile comprising a distribution in location across the width of the sports track for the at least two track segments of the second set of track segments, and the first distribution profile representing a number of expected participants for each track segment of the at least two track segments of the second set of track segments;

detect and output, after the start of a race and before the end of the race, an irregularity on the sports track when the first track segment passage results deviate by at least a deviation margin from the second track segment passage results; and generate, after the start of a race and before the end of the race, an alert signal in response to detecting the irregularity.

* * * * *